US010072787B2

(12) United States Patent
Otero Solivan

(10) Patent No.: US 10,072,787 B2
(45) Date of Patent: Sep. 11, 2018

(54) CLAMPING SYSTEM

(71) Applicant: Honda Motor Co., Ltd., Tokyo (JP)

(72) Inventor: Orlando Otero Solivan, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 74 days.

(21) Appl. No.: 15/423,403

(22) Filed: Feb. 2, 2017

(65) Prior Publication Data

US 2018/0216774 A1    Aug. 2, 2018

(51) Int. Cl.
*F16L 9/00*      (2006.01)
*F16L 59/02*     (2006.01)
*F01N 13/14*     (2010.01)

(52) U.S. Cl.
CPC .......... *F16L 59/028* (2013.01); *F01N 13/148* (2013.01)

(58) Field of Classification Search
CPC ........ F16L 59/021; F16L 59/024; F16L 33/08
USPC ................ 138/110, 156–158; 24/274 R, 279
See application file for complete search history.

(56) References Cited

U.S. PATENT DOCUMENTS

| | | | | |
|---|---|---|---|---|
| 1,905,794 A * | 4/1933 | Burke | ..................... | H02G 9/065 138/158 |
| 2,374,815 A * | 5/1945 | Haas, Jr. | ................. | F16L 41/02 138/161 |
| 3,365,218 A | 1/1968 | Denyes et al. | | |
| 3,567,165 A * | 3/1971 | White | ....................... | F16L 3/12 24/274 R |
| 3,628,572 A * | 12/1971 | Shannon | ................. | B29C 63/22 138/149 |
| 4,614,451 A | 9/1986 | Braisted, Jr. | | |
| 4,667,505 A * | 5/1987 | Sharp | .................... | F16L 21/002 138/104 |
| 5,544,392 A | 8/1996 | Oetiker | | |
| 5,880,413 A | 3/1999 | Wagner et al. | | |
| 6,438,949 B1 * | 8/2002 | Nozaki | ................... | B60K 13/04 123/184.21 |
| 6,942,253 B2 | 9/2005 | Bowater | | |
| 7,100,641 B2 * | 9/2006 | Tyrer | ...................... | F16L 1/123 138/110 |
| 7,263,827 B2 | 9/2007 | Oshima et al. | | |
| 7,401,463 B2 | 7/2008 | Tsuruta | | |
| 7,434,656 B2 | 10/2008 | Yasuda et al. | | |
| 7,458,619 B2 * | 12/2008 | Cassel | ................. | F01N 13/1805 24/279 |
| 7,520,539 B2 | 4/2009 | Ignaczak et al. | | |
| 7,832,776 B2 * | 11/2010 | Cassel | ................. | F01N 13/1805 24/279 |
| 7,870,725 B2 | 1/2011 | Hazelton | | |

(Continued)

FOREIGN PATENT DOCUMENTS

JP           S63032895 Y       9/1988

*Primary Examiner* — Patrick F Brinson
(74) *Attorney, Agent, or Firm* — Honda Patents & Technologies North America, LLC; Clifford B Vaterlaus

(57) ABSTRACT

A clamping system includes a cover member for covering a portion of an outer periphery of a member. The cover member has an edge and an alignment feature may be disposed on the edge. The clamping system may also include a clamp having a band forming a loop, and a fastener for adjustably fixing a size of the loop. The clamp may be received onto the cover member such that the fastener aligns with the alignment feature, thereby positioning the fastener in a predetermined position in an angular direction with respect to the cover member.

20 Claims, 7 Drawing Sheets

(56) References Cited

U.S. PATENT DOCUMENTS

| | | |
|---|---|---|
| 9,103,476 B2 | 8/2015 | Geese et al. |
| 2008/0284162 A1 | 11/2008 | Piscitelli |
| 2015/0337713 A1 | 11/2015 | Callahan |

* cited by examiner

CLAMPING SYSTEM

TECHNICAL FIELD

The present disclosure relates generally to clamping systems for clamping cover members, and more particularly to a clamping system that facilitates accurate alignment, positioning and orientation of a clamp with respect to the cover members.

BACKGROUND

A variety of covers are used to cover fluid supply pipes, exhaust pipes, conduits and electrical conductors etc. to provide protection, thermal and/or electrical insulation. Generally, a cover is installed onto an outer periphery of a pipe or a conduit being protected and/or covered, using a clamp with a fastening mechanism to fasten the cover onto the outer periphery.

Often the pipe being protected and/or covered is a part of a much larger assembly. During the installation or servicing, the pipe has to be accessed while the pipe is still installed in the larger assembly. This may make it tedious for an operator to access the clamp or the fastening mechanism of the clamp, if the clamp is not properly oriented or positioned, or if a fastener, such as a screw of the fastening mechanism, is not properly aligned in a required direction.

A number of other challenges arise when two or more covers are being used to cover the outer periphery, and the clamp, in addition to fastening the two or more covers to the pipe, also does the job of keeping the two or more covers together. In some situations, the fastening mechanism may be improperly applied and ends up too close to a joint between the two covers, affecting the dynamic stability of the entire clamping system including the two covers and the clamp.

For example, one scenario exists in which covers are installed on an exhaust pipe system of an off-road vehicle. In such a scenario the clamping system may be subjected to constant vibrations and loads. Improperly applied fastening mechanisms may fail causing the entire clamping system to fail under fatigue or impact loading.

In another situation, the clamp may have a band with a number of slots. Any slot, of the number of slots, lying between boundaries of the two covers may result in reduced clamping strength of the clamping system, as that slot becomes a site for localized concentration of stresses. This too may cause the clamping system to fail under even very small loads. Thus, it is beneficial that any such potential causes of failure may be addressed during the design phase of the clamping system itself, before going on to the assembly phase.

In light of the discussion above, there is clearly a need in the art for a clamping system that does not suffer from the above mentioned deficiencies.

SUMMARY

According to a first aspect of the present disclosure, there is provided a clamping system. The clamping system comprises a first cover member for covering a portion of an outer periphery of a member, the first cover member having a first portion on one of a first proximal and a first distal end. The first portion comprises a first leading edge and an alignment feature disposed on the first leading edge. A first clamp is provided comprising a first band forming a first loop and a first fastener adapted to adjustably fix a size of the first loop. The first clamp may be adapted to be received onto the first portion, such that the first fastener aligns with the alignment feature of the first portion, thereby positioning the first fastener in a predetermined position in an angular direction of the first clamp. Thus, by changing the location of the alignment feature along the first leading edge, the position of the first fastener can be predetermined accordingly for ease of assembly and service. Also, the position of the first fastener can be predetermined to ensure that unwanted areas of localized stress concentration are not created.

According to a second aspect of the present disclosure, there is provided a clamping system, comprising a first cover member for covering a portion of an outer periphery of a member, the first cover member having a first portion on one of a first proximal and a first distal end and a first clamp comprising a first band forming a first loop and a first fastener adapted to adjustably fix a size of the first loop, the first clamp being adapted to be received onto the first portion. Further, the first portion comprises a positioning feature disposed on a side edge of the first portion. The positioning feature comprises a pair of projections projecting from the side edge of the first portion, such that the first band extends between the pair of projections to hold the first clamp in a predetermined position to the first band in an axial direction of the first clamp.

According to a third aspect of the present disclosure, there is provided a clamping system, comprising a first cover member for covering a portion of an outer periphery of a member. The first cover member having a first portion on one of a first proximal and a first distal end, the first portion comprising an alignment feature. The system comprises a second cover member for covering another portion of the outer periphery of the member. The first cover member and the second cover member are joined together to cover the member such that the second cover member has a second portion on the opposite end of the first portion. The second portion comprises a second alignment feature. A first clamp may be provided comprising a first band forming a first loop and a first fastener adapted to adjustably fix a size of the first loop. The first clamp may be adapted to be received onto the first portion and join the first cover member and the second cover member at the end of the first portion. A second clamp may be provided comprising a second band forming a second loop and a second fastener adapted to adjustably fix a size of the second loop. The second clamp may be adapted to be received onto the second portion and join the first cover member and the second cover member at the end of the second portion.

BRIEF DESCRIPTION OF THE ACCOMPANYING DRAWINGS

So that the manner in which the above recited features of the present disclosure can be understood in detail, a more particular description of the disclosure is illustrated in the appended drawings. It is to be noted, however, that the appended drawings illustrate only typical embodiments of the disclosure and are therefore not to be considered limiting in scope, as the disclosure may support other equally effective embodiments.

These and other features, benefits, and advantages of the present disclosure will become apparent by reference to the following figures, with like reference numbers referring to like structures across the views, wherein.

DETAILED DESCRIPTION OF THE PREFERRED EMBODIMENTS

Figure 1:
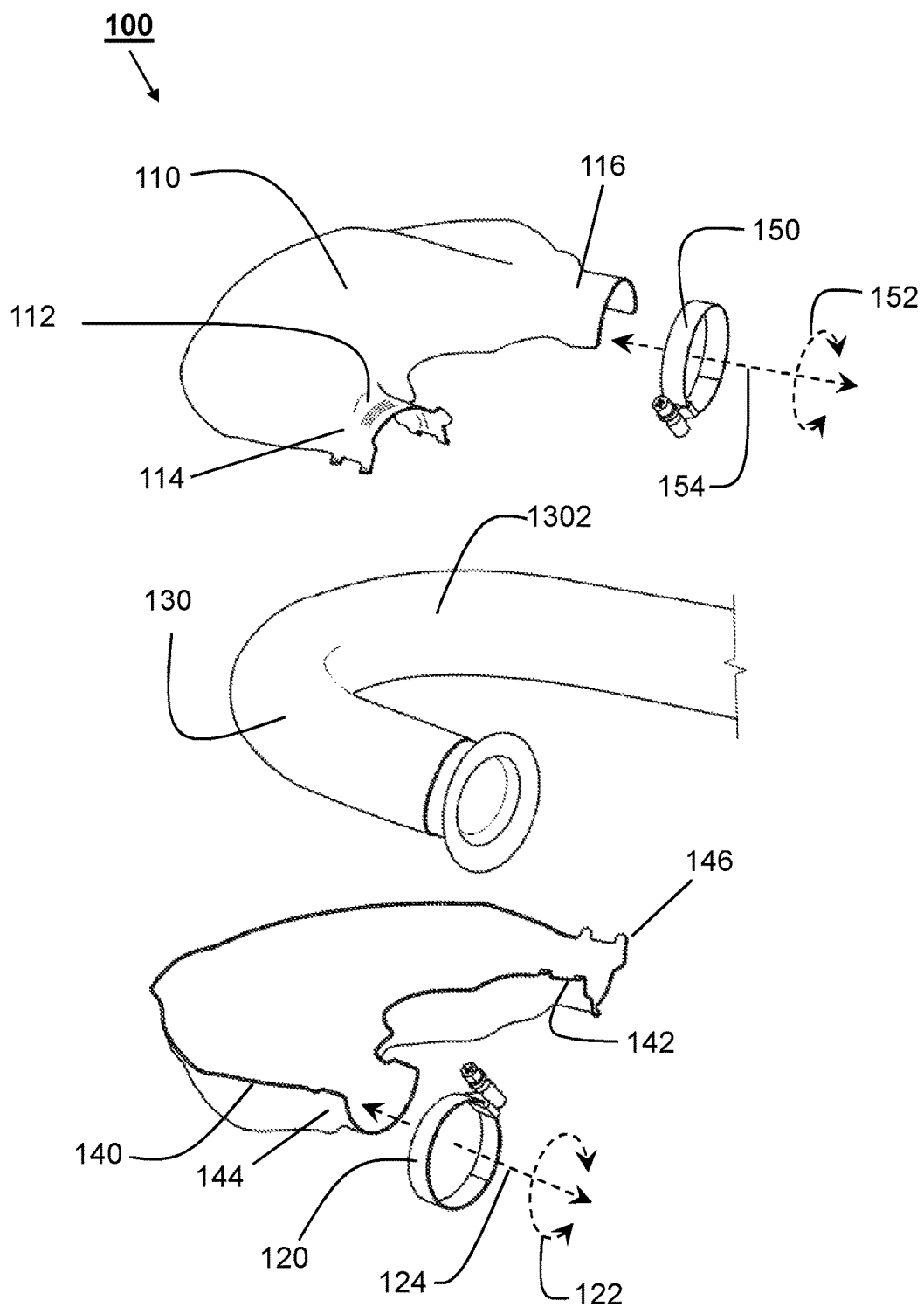
FIG. 1 illustrates an exploded view of a clamping system, in accordance with an embodiment of the present disclosure.

While the present disclosure is described herein by way of example using embodiments and illustrative drawings, those skilled in the art will recognize that the disclosure is not limited to the embodiments of drawing or drawings described, and are not intended to represent the scale of the various components. Further, some components that may form a part of the disclosure may not be illustrated in certain figures, for ease of illustration, and such omissions do not limit the embodiments outlined in any way. It should be understood that the drawings and detailed description thereto are not intended to limit the disclosure to the particular form disclosed, but on the contrary, the disclosure is to cover all modifications, equivalents, and alternatives falling within the scope of the present disclosure as defined by the appended claims. As used throughout this description, the word "may" is used in a permissive sense (i.e. meaning having the potential to), rather than the mandatory sense, (i.e. meaning must). Further, the words "a" or "an" mean "at least one" and the word "plurality" means "two or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents, acts, materials, devices, articles and the like is included in the specification solely for the purpose of providing a context for the present disclosure. It is not suggested or represented that any or all of these matters form part of the prior art base or were common general knowledge in the field relevant to the present disclosure.

The present disclosure is described hereinafter by various embodiments with reference to the accompanying drawing, wherein reference numerals used in the accompanying drawing correspond to the like elements throughout the description. This disclosure may, however, be embodied in many different forms and should not be construed as limited to the embodiment set forth herein. Rather, the embodiment is provided so that this disclosure will be thorough and complete and will fully convey the scope of the disclosure to those skilled in the art. In the following detailed description, numeric values and ranges are provided for various aspects of the implementations described. These values and ranges are to be treated as examples only, and are not intended to limit the scope of the claims. In addition, a number of materials are identified as suitable for various facets of the implementations. These materials are to be treated as exemplary, and are not intended to limit the scope of the disclosure.

Referring to the drawings, the disclosure will now be described in more detail. FIG. 1 illustrates an exploded view of a clamping system 100, in accordance with an embodiment of the present disclosure. As shown in FIG. 1, the clamping system 100 includes a first cover member 110 having a first portion 112, a first clamp 120, a second cover member 140 having a second portion 142, and a second clamp 150. The first cover member 110 has been provided for covering a portion of an outer periphery 1302 of a member 130. For example, the member 130 can be one of, but is not limited to, a coolant supply pipe or an engine exhaust pipe, needing thermal insulation and/or protection against external agents on the road or even from rust, with respect to surroundings of the member 130.

The first cover member 110 has a first proximal end 114 and a first distal end 116. Further, the first cover member 110 has a first portion 112 on one of the first proximal end 114 and the first distal end 116. In accordance with an embodiment, the first portion 112 is on the first proximal end 114. In another embodiment the first portion 112 is on the first distal end 116. In accordance with an embodiment of the present disclosure, the first proximal end 114 and the first distal end 116 of the first cover member 110 has a cross-section corresponding to a profile of the outer periphery 1302 of the member 130. This way, the cross-section of the first proximal end 114 and the first distal end 116 can be customized according to the profile of the outer periphery 1302 of the member 130. This ensures a tight fit of the first cover member 110 and allows a rather rigid construction for the first cover member 110, especially when the first cover member 110 is made of a material having good water-resistant or insulating properties, such as a polymer.

In accordance with another embodiment of the present disclosure, the first proximal end and the first distal end of the first cover member 110 have a substantially semi-circular cross-section. The semi-circular cross-section allows the first cover member 110 to be installed onto the members 130 of various profiles. The semi-circular cross-section may be recommended when a single first cover member 110 has been designed for a number and variety of the members 130, leading to overall savings in design and tooling costs.

Figure 2:
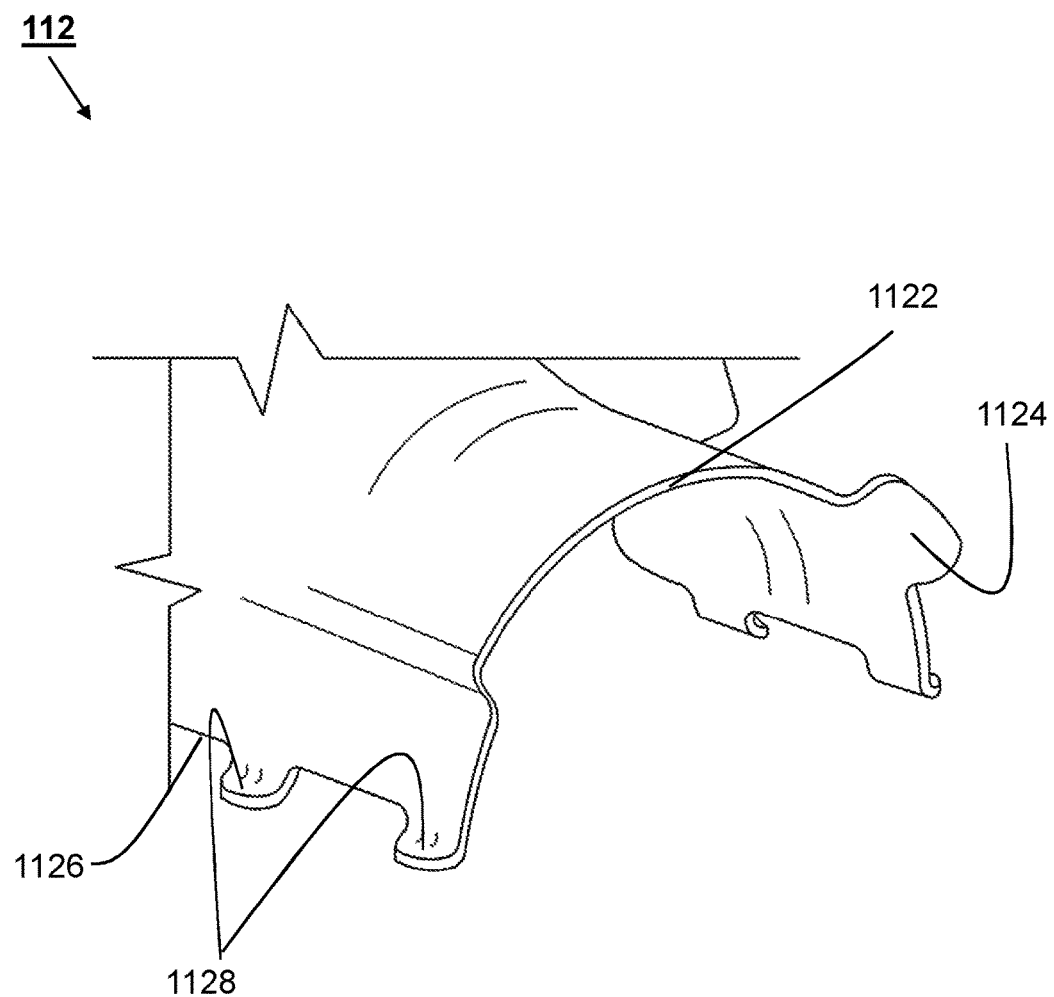
FIG. 2 illustrates a perspective view of a first portion of a first cover member, in accordance with an embodiment of the present disclosure.

FIG. 2 illustrates a perspective view of the first portion 112 of the first cover member 110, in accordance with an embodiment of the present disclosure. As shown in FIG. 2, the first portion 112 includes a first leading edge 1122 and an alignment feature 1124 disposed on the first leading edge 1122. In accordance with an embodiment of the present disclosure, the alignment feature 1124 is an arc segment or tab protruding from the first leading edge 1122. In accordance with an embodiment, the arc segment is bent in a direction substantially perpendicular to the first leading edge 1122. The bending of the arc segment perpendicular to the first leading edge 1122 ensures that any chance of the arc segment butting, pressing or intersecting with any other part of the clamping system 100 or of an assembly of which the clamping system 100 is a part, is minimized.

Further, the first cover member 110 further includes a positioning feature 1128 disposed on a side edge 1126 of the first portion 112. In accordance with an embodiment of the present disclosure, the positioning feature 1128 includes a pair of projections projecting from the side edge 1126 of the first portion 112. It is both convenient and cost effective to provide the pair of projections on the side edge 1126, as the same can be achieved through sheet metal working, in case the first cover member 110 has been made of metal. Providing the pair of projections at any other location along the first portion 112 may have required a further metal joining step. Alternately, if the first cover member 110 is to be made of a plastic or a polymer material, the same allows for comparatively less complex molds and savings in tooling costs. However, it will be appreciated by a person skilled in the art, that the positioning feature 1128 is not limited to the pair of projections alone.

Further, the clamping system 100 includes a first clamp 120 being adapted to be received onto the first portion 112. The first clamp 120 has a primary purpose of fastening the first cover member 110 onto the outer periphery 1302 of the member 130.

Figure 3:
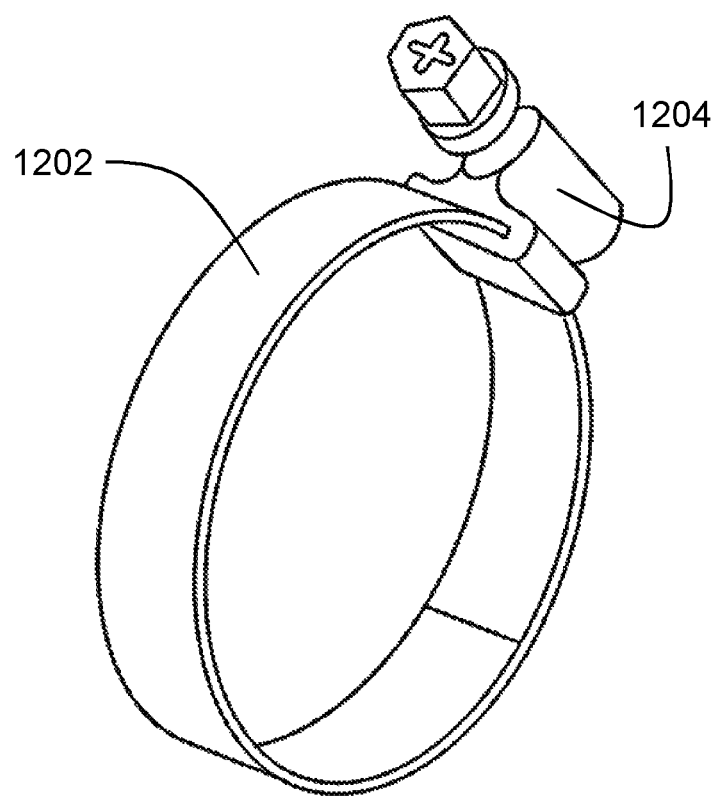
FIG. 3 illustrates a perspective view of a first clamp, in accordance with an embodiment of the present disclosure.

FIG. 3 illustrates a perspective view of the first clamp 120 in accordance with an embodiment of the present disclosure. As shown in FIG. 3, the first clamp 120 includes a first band 1202 forming a first loop and a first fastener 1204 adapted to adjustably fix a size of the first loop. In accordance with an embodiment, the first band 1202 includes a thread pattern cut or pressed into the first band 1202 in the form of a plurality of slots. Further, the first fastener 1204 is a captive screw. On rotating the captive screw, the captive screw acts as a worm drive pulling the thread pattern of the first band 1202, causing the first loop to tighten or loosen. The first fastener 1204 aligns with the alignment feature 1124 of the first portion 112, thereby positioning the first fastener 1204 in a predetermined position in an angular direction (122 shown in FIG. 1) of the first clamp 120. The first band 1202 extends between the pair of projections to hold the first clamp 120 in a predetermined orientation with respect to the first cover member 110. In accordance with various other embodiments, the positioning feature 1128 can include one of a pair of grooves, a color-highlighted section, and a channel. In that manner, the first band 1202 may extend between the pair of grooves, or in the channel. Further, the first band 1202 may be provided along or covering the color-highlighted section. The positioning feature 1128 provides a predetermined position to the first band 1202 in an axial direction (124) of the first clamp 120. The discussion above can be understood from the corresponding figures.

Figure 4:
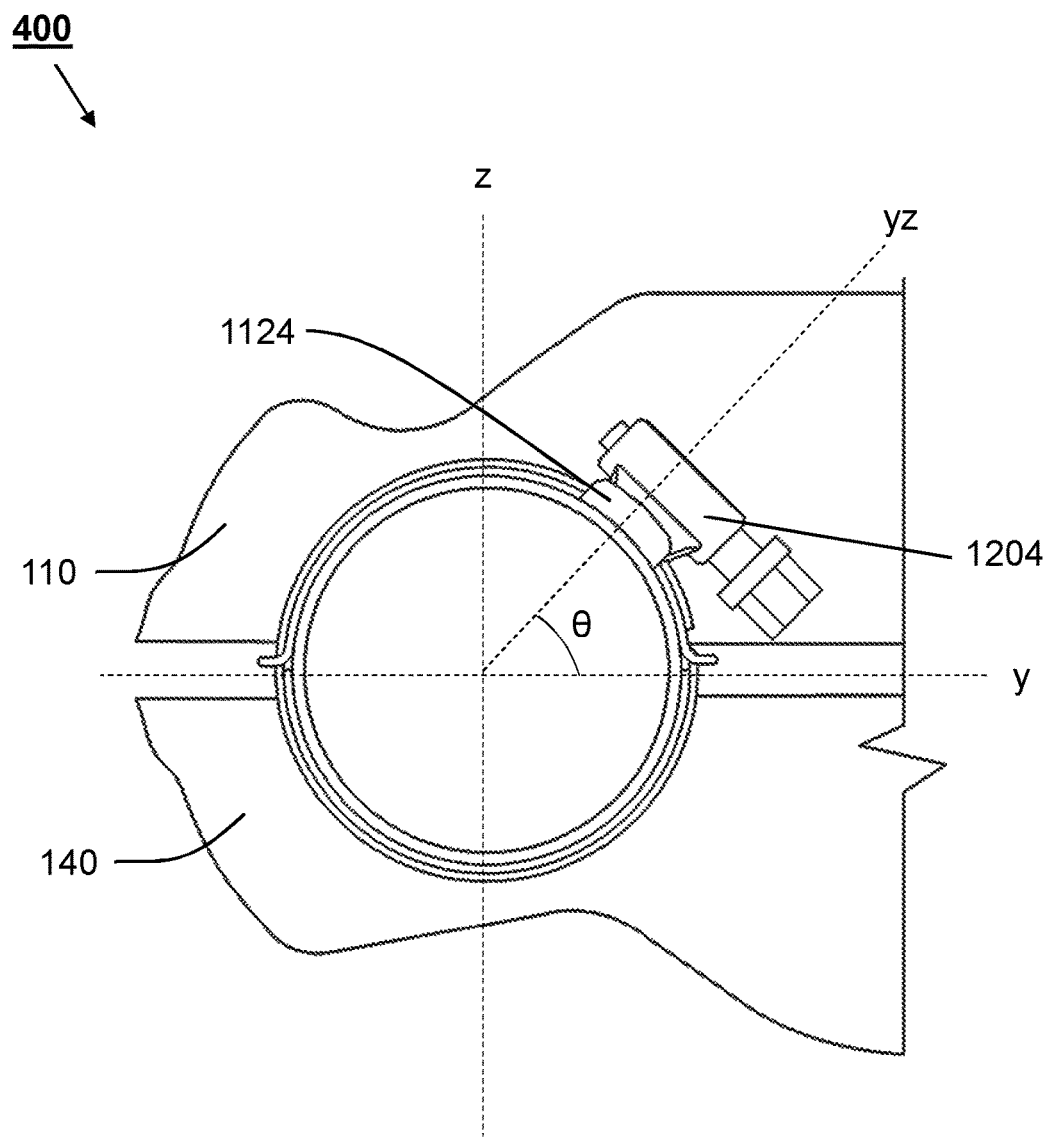
FIG. 4 illustrates a partial front view of a clamping system, in accordance with an embodiment of the present disclosure.

FIG. 4 illustrates a partial front view of the clamping system 100, in accordance with an embodiment 400 of the present disclosure. As shown in FIG. 4, the first fastener 1204 aligns with the alignment feature 1124 of the first portion 112, thereby positioning the first fastener 1204 in a predetermined position in the angular direction (122) of the first clamp 120. In other words, the alignment feature 1124 may have a thickness corresponding to a thickness of the first leading edge 1122, and opposing faces separated by the thickness. The first fastener 1204 may be aligned with a face of the alignment feature 1124 in the predetermined position. The alignment feature 1124 is disposed at an angle θ with respect to a "y" axis of the first clamp 120. The "y" axis lies in a plane of the first loop of the first clamp 120. The first fastener 1204 aligned with the alignment feature 1124 is also positioned at the angle θ. This ensures that by changing the angle θ, i.e. by changing the location of the alignment feature 1124 along the first leading edge 1122, in the design of the first cover member 110, the position of the first fastener 1204 can also be changed, allowing the first fastener 1204 to be positioned in the predetermined position. This is particularly helpful as the position of the first fastener 1204 can be set during the design phase of the first cover member 110 itself. Further, ease of assembly of the first clamp 120 onto the first portion 112 can be analyzed using CAD models of the clamping system 100. As a result, when the clamping system 100 reaches the assembly line, no time would be wasted in deciding the position of the first fastener 1204. This is helpful when the clamping system 100 is being assembled as per time-bound production schedules.

The CAD models also allow service mock-ups to be performed, hence it will be easier to analyze the ease of removal of the first clamp 120 from the first portion 112 and hence the first cover member 110 from the outer periphery 1302 of the member 130. Again, based on the analysis performed during the service mock-ups, the position of the alignment feature 1124 along the first leading edge 1122 may be optimized for easy or convenient servicing of the clamping system 100. Another factor which may be taken into account is that if the first band 1202 has one or more slots, no slots are lying between boundaries of the first cover member 110 and the second cover member 140. This is important as such slots may become sites for localized concentration of stresses, leading to failure of the first band 1202 under very small loads compared to the yield strength of a material of the first band 1202.

Figure 5:
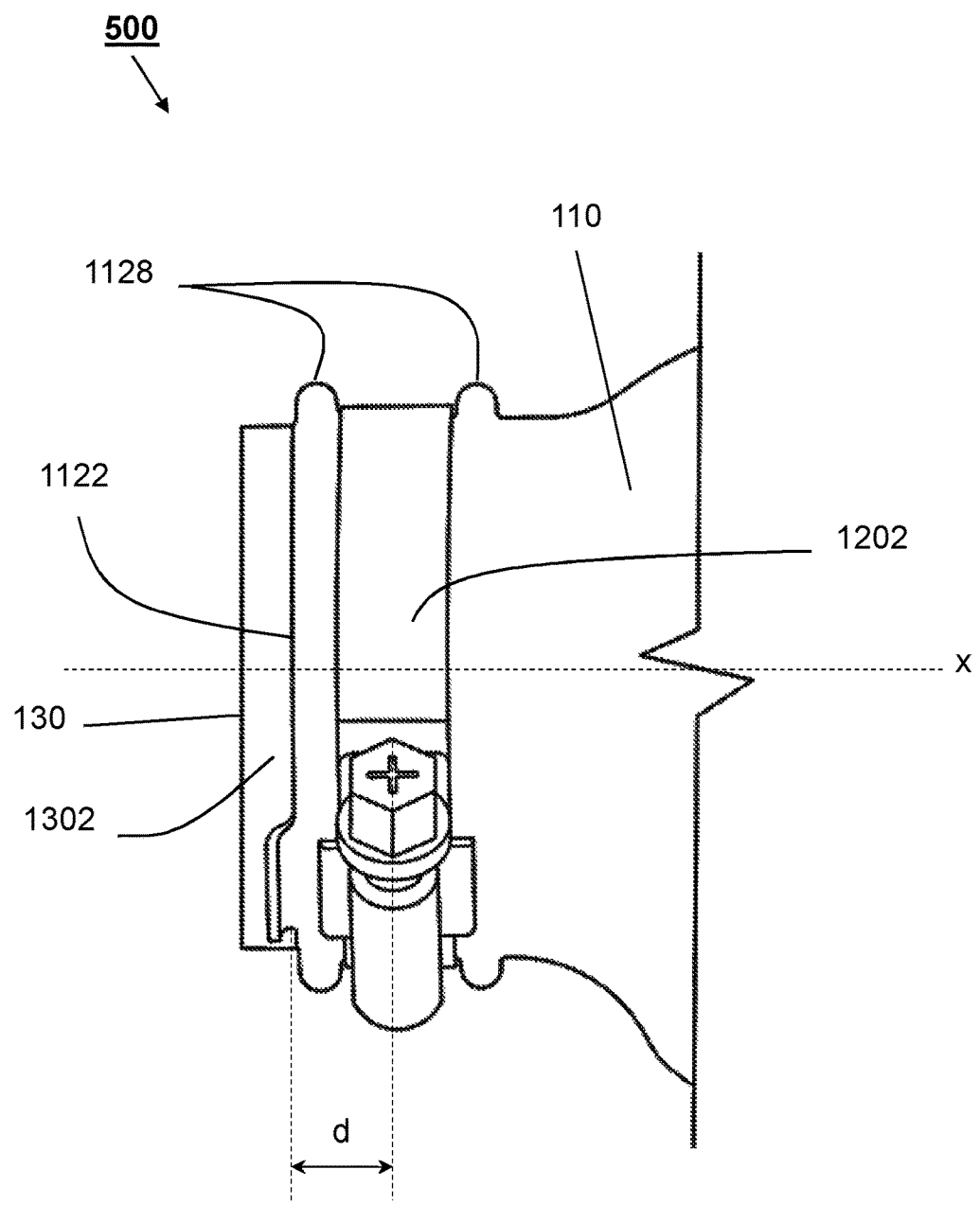
FIG. 5 illustrates a partial plan view of a clamping system, in accordance with an embodiment of the present disclosure.

FIG. 5 illustrates a partial plan view of the clamping system 100, in accordance with an embodiment 500 of the present disclosure. As shown in FIG. 5, the positioning feature 1128 holds the first clamp 120 in a predetermined orientation with respect to the first cover member 110. Further, the positioning feature 1128 provides a predetermined position to the first band 1202 in an axial direction (124) of the first clamp 120. The positioning feature 1128 provides a predetermined position to the first band 1202 along an axis "x" of the first clamp 120. The axis "x" is perpendicular to the plane of the first loop of the first clamp 120. In this case, the predetermined position is at a distance "d" from the first leading edge 1122 of the first portion 112. This is important for the dynamic stability of the clamping system 100. Having the first band 1202 very close to the first leading edge 1122 would reduce the dynamic stability of the clamping system 100. One scenario with respect to the dynamic stability would be apparent with respect to off-road vehicles. The off-road vehicles are continuously subjected to instantaneous and cyclical loads. The first band 1202, if not positioned properly along the axis "x" may fail under such loads, causing the clamping system 100 to deteriorate and/or fall off from an off-road vehicle in which the clamping system 100 has been deployed.

In accordance with an embodiment of the present disclosure, the clamping system 100 further includes a second cover member 140 for covering another portion of the outer periphery 1302 of the member 130. The second cover member 140 has a second proximal end 144 and a second distal end 146. In accordance with an embodiment, the first cover member 110 and the second cover member 140 are joined together to cover the member 130 such that the second cover member 140 has a second portion 142 on the opposite end of the first portion 112. In accordance with an embodiment, the first portion 112 has been provided at the first proximal end 114 and the second portion 142 has been provided at the second distal end 146. In accordance with another embodiment, the first portion 112 has been provided at the first distal end 116 and the second portion 142 has been provided at the second proximal end 144.

The first clamp 120 is adapted to join the first cover member 110 and the second cover member 140 at the end of the first portion 112. Further, the clamping system 100 includes a second clamp 150. The second clamp 150 is adapted to be received onto the second portion 142 and join the first cover member 110 and the second cover member 140 at the end of the second portion 142. Having one or more additional cover members is advantageous when the member 130 has already been installed in a larger assembly, and the two ends of the member 130 have been arrested making it difficult for the member 130 to be inserted into an all encapsulating cover member.

Figure 6:
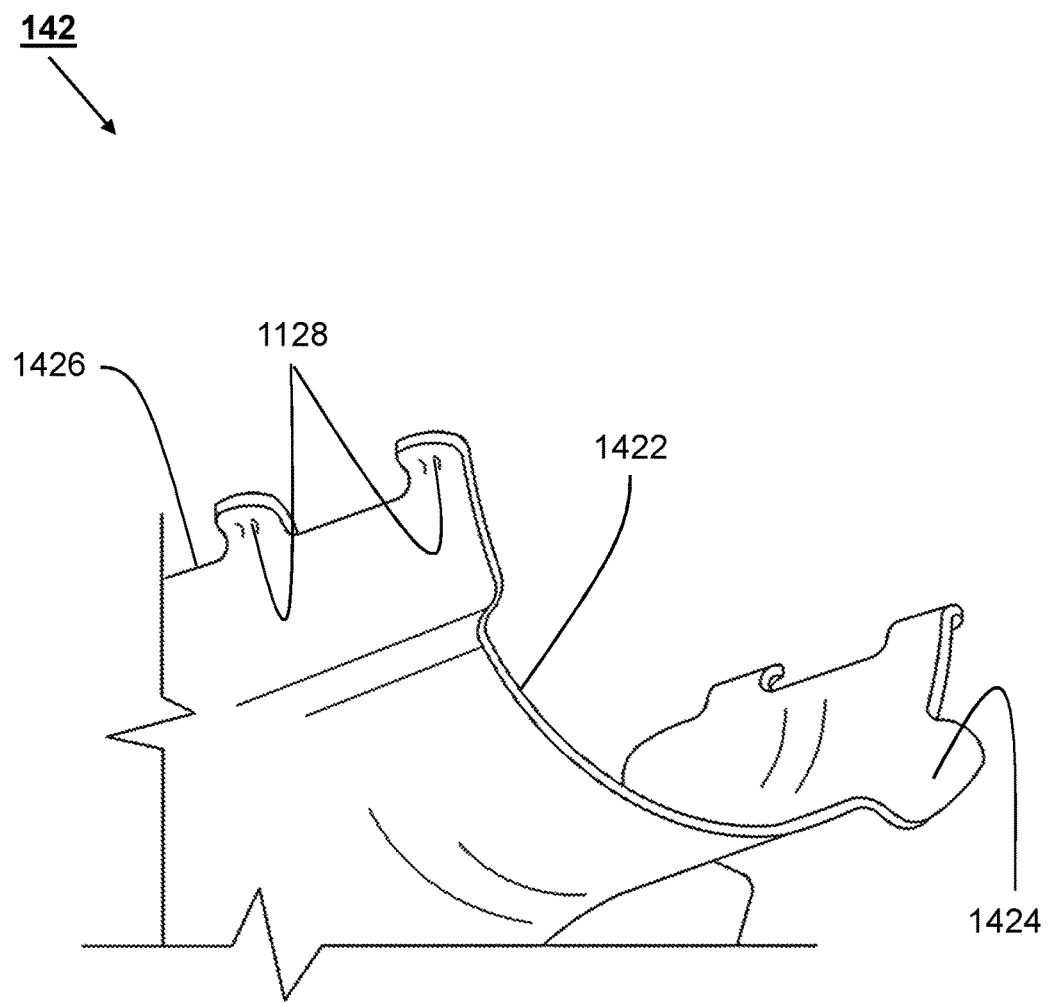
FIG. 6 illustrates a perspective view of a second portion of a second cover member, in accordance with an embodiment of the present disclosure.

FIG. 6 illustrates a perspective view of the second portion 142 of the second cover member 140, in accordance with an embodiment of the present disclosure. The second portion 142 includes a second edge 1422 and a second alignment feature 1424 disposed on the second edge 1422. Further, the second cover member 140 also includes the positioning feature 1128 disposed on a side edge 1426 of the second portion 142. In that manner, the first cover member 110 and the second cover member 142 both include the positioning feature 1128. In accordance with an embodiment, both the positioning features 1128 are disposed near the joint of the first cover member 110 and the second cover member 140.

It will be understood that in one embodiment of the present disclosure, the first cover member 110 may be structurally identical to the second cover member 140. Thus, manufacturing cost of the first cover member 110 and the second cover member 140 may be reduced. In use, the second cover member 140 may be attached to the first cover member 110 in an inverted position with the second alignment feature 1424 positioned adjacent the distal end 116 of the first cover member 110.

In an alternative embodiment, the first cover member 110 may be joined to the second cover member 140 at a location spaced apart from the first portion 112 and the second portion 142, for example at a middle area of the two covers. In such embodiment, the first cover member 110 may be joined to the second cover member 140 using a hinge member, fastener, weld or the like. Accordingly, the first cover member 110 and second cover member 140 may be folded together to hold the member 130, and the first clamp 120 and second clamp 150 can subsequently be installed.

Figure 7:
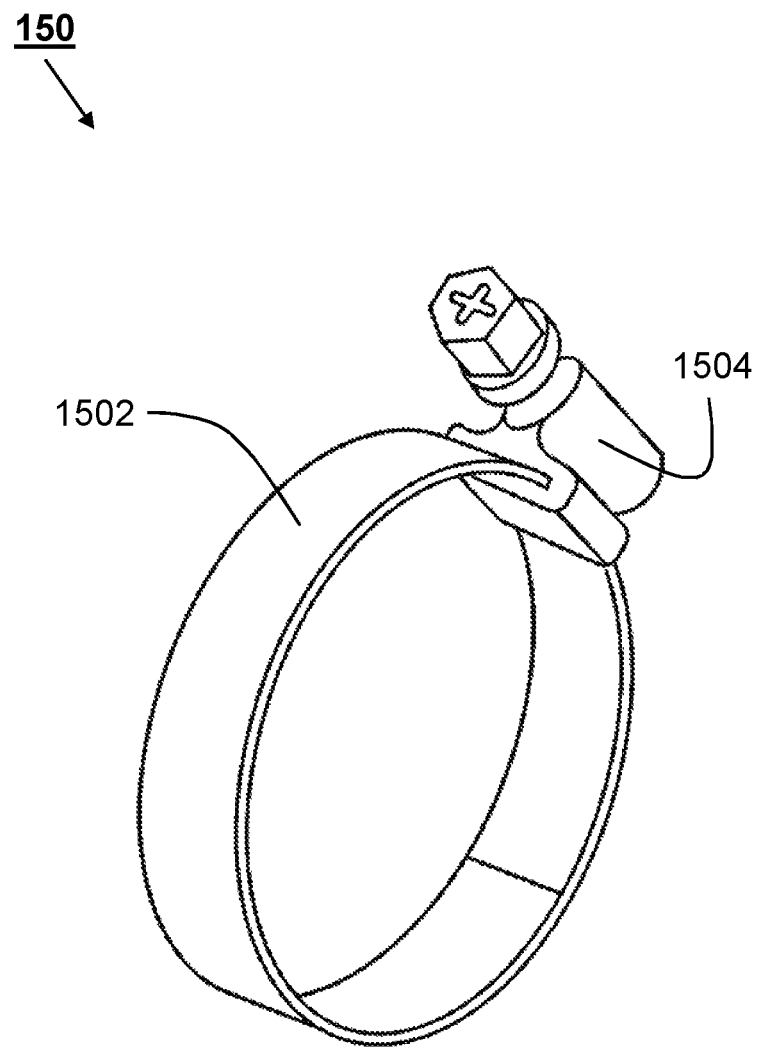
FIG. 7 illustrates a perspective view of a second clamp, in accordance with an embodiment of the present disclosure.

FIG. 7 illustrates a perspective view of the second clamp 150 in accordance with an embodiment of the present disclosure. As shown in FIG. 7, the second clamp 150 includes a second band 1502 forming a second loop and a second fastener 1504 adapted to adjustably fix a size of the second loop. Similar to the discussion above with respect to the first clamp 120, the second fastener 1504 aligns with the second alignment feature 1424 of the second portion 142, thereby positioning the second fastener 1504 in a predetermined position in an angular direction (152) of the second clamp 150. The second band 1502 extends between the pair of projections to hold the second clamp 150 in a predetermined orientation with respect to the second cover member 140. The positioning feature 1128 provides a predetermined position to the second band 1502 in an axial direction (154) of the second clamp 150.

Various modifications to these embodiments are apparent to those skilled in the art from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the disclosure is anticipated to encompass all other such alternatives, modifications, and variations that fall within the scope of the present disclosure and appended claims.

What is claimed is:

1. A clamping system, comprising:
   a first cover member for covering a portion of an outer periphery of a member, the first cover member having a first portion on one of a first proximal and a first distal end, the first portion comprising a first leading edge and an alignment feature disposed on the first leading edge; and
   a first clamp comprising a first band forming a first loop and a first fastener adapted to adjustably fix a size of the first loop, the first clamp being adapted to be received onto the first portion, such that the first fastener aligns with the alignment feature of the first portion, thereby positioning the first fastener in a predetermined position in an angular direction of the first clamp;
   wherein the alignment feature comprises a tab extending radially from the first leading edge.

2. The clamping system according to claim 1, wherein the first proximal end and the first distal end of the first cover member have a substantially semi-circular cross-section.

3. The clamping system according to claim 1, wherein the first proximal end and the first distal end of the first cover member have a cross-section corresponding to a profile of the outer periphery of the member.

4. The clamping system according to claim 1, further comprising a second cover member for covering another portion of the outer periphery of the member, wherein the first cover member and the second cover member are joined together to cover the member such that the second cover member has a second portion on the opposite end of the first portion, the second portion comprising a second edge and a second alignment feature disposed on the second edge.

5. The clamping system according to claim 4, wherein the first cover member and the second cover member both comprise a positioning feature at the first portion and the second portion respectively, both the positioning features disposed near the joint of the first cover member and the second cover member.

6. The clamping system according to claim 1, wherein the first cover member further comprises a positioning feature disposed on a side edge of the first portion, such that the positioning feature provides a predetermined position to the first band in an axial direction of the first clamp.

7. The clamping system according to claim 6, wherein the positioning feature comprises a pair of projections projecting from the side edge of the first portion, such that the first band extends between the pair of projections to hold the first clamp in a predetermined orientation with respect to the first cover member.

8. A clamping system, comprising:
   a first cover member for covering a portion of an outer periphery of a member, the first cover member having a first portion on one of a first proximal and a first distal end; and
   a first clamp comprising a first band forming a first loop and a first fastener adapted to adjustably fix a size of the first loop, the first clamp being adapted to be received onto the first portion;
   wherein the first portion further comprises a positioning feature disposed on a side edge of the first portion, wherein the positioning feature comprises a pair of tabs defining a pair of projections projecting from the side edge of the first portion, such that the first band extends between the pair of projections to hold the first clamp in a predetermined position in an axial direction of the first clamp.

9. The clamping system according to claim 8 wherein the first proximal end and the first distal end of the first cover member have a substantially semi-circular cross-section.

10. The clamping system according to claim 8, wherein the first proximal end and the first distal end of the first cover member have a cross-section corresponding to a profile of the outer periphery of the member.

11. The clamping system according to claim 8, further comprising a second cover member for covering another portion of the outer periphery of the member, wherein the first cover member and the second cover member are joined together to cover the member such that the second cover member has a second portion on the opposite end of the first portion, and wherein the second cover member has a configuration that is identical to the first cover member.

12. The clamping system according to claim 8, wherein the first cover member further comprises an alignment feature, such that the first fastener aligns with the alignment feature of the first portion, thereby positioning the first fastener in a predetermined position in an angular direction of the first clamp.

13. The clamping system according to claim 8, further comprising a second cover member for covering another portion of the outer periphery of the member, wherein the first cover member and the second cover member are joined together to cover the member such that the second cover member has a second portion on the opposite end of the first portion.

14. The clamping system according to claim 13, wherein the first cover member and the second cover member both comprise a positioning feature at the first portion and the second portion respectively, both the positioning features being disposed near the joint of the first cover member and the second cover member.

15. The clamping system according to claim 8, wherein the first cover member further comprises a first leading edge and an alignment feature disposed on the first leading edge, such that the first fastener aligns with the alignment feature of the first portion, thereby positioning the first fastener in a predetermined position in an angular direction of the first clamp.

16. A clamping system, comprising:
a first cover member for covering a portion of an outer periphery of a member, the first cover member having a first portion on one of a first proximal end and a first distal end, the first portion comprising a leading edge and a side edge, and a first alignment feature disposed on the leading edge at a position spaced apart from the side edge;
a second cover member for covering another portion of the outer periphery of the member, wherein the first cover member and the second cover member are joined together to cover the member such that the second cover member has a second portion on the opposite end of the first portion, the second portion comprising a second alignment feature;
a first clamp comprising a first band forming a first loop and a first fastener adapted to adjustably fix a size of the first loop, the first clamp being adapted to be received onto the first portion and join the first cover member and the second cover member at the first portion; and
a second clamp comprising a second band forming a second loop and a second fastener adapted to adjustably fix a size of the second loop, the second clamp being adapted to be received onto the second portion and join the first cover member and the second cover member at the second portion.

17. The clamping system according to claim 16, wherein the first cover member and the second cover member both comprise a positioning feature disposed on a side edge of the first portion and the second portion respectively, both the positioning features disposed near a joint between the first cover member and the second cover member.

18. The clamping system according to claim 17, wherein the positioning feature is a pair of projections projecting from the side edge of the first portion and the second portion respectively, such that:
the first band extends between the pair of projections of the first portion to hold the first clamp in a predetermined orientation with respect to the first cover member; and
the second band extends between the pair of projections of the second portion to hold the second clamp in a predetermined orientation with respect to the second cover member.

19. The clamping system according to claim 16, wherein a thickness of the first alignment feature is equal to a thickness of the first cover member at the leading edge.

20. The clamping system according to claim 15, wherein the alignment feature comprises a tab extending radially from the first leading edge.

* * * * *